US012609971B2

(12) United States Patent
Mao et al.

(10) Patent No.: US 12,609,971 B2
(45) Date of Patent: Apr. 21, 2026

(54) CALL EXCEPTION PROCESSING METHOD AND ELECTRONIC DEVICE

(71) Applicant: VIVO MOBILE COMMUNICATION CO., LTD., Dongguan (CN)

(72) Inventors: Yuanze Mao, Dongguan (CN); Zhonghuang Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 70 days.

(21) Appl. No.: 18/653,110

(22) Filed: May 2, 2024

(65) Prior Publication Data

US 2024/0283829 A1 Aug. 22, 2024

Related U.S. Application Data

(63) Continuation of application No. PCT/CN2022/130607, filed on Nov. 8, 2022.

(30) Foreign Application Priority Data

Nov. 8, 2021 (CN) .......................... 202111312127.3

(51) Int. Cl.
| | |
|---|---|
| *H04L 65/1069* | (2022.01) |
| *H04L 65/1016* | (2022.01) |
| *H04L 65/1104* | (2022.01) |

(52) U.S. Cl.
CPC ...... *H04L 65/1069* (2013.01); *H04L 65/1016* (2013.01); *H04L 65/1104* (2022.05)

(58) Field of Classification Search
CPC ............. H04L 65/1016; H04L 65/1069; H04L 65/1104
USPC ........................................................ 709/227
See application file for complete search history.

(56) References Cited

U.S. PATENT DOCUMENTS

| | | | |
|---|---|---|---|
| 2008/0084975 A1 | 4/2008 | Schwartz | |
| 2019/0306202 A1 | 10/2019 | Sinha et al. | |

FOREIGN PATENT DOCUMENTS

| | | | | |
|---|---|---|---|---|
| CN | 108234395 A | | 6/2018 | |
| CN | 109361892 A | | 2/2019 | |
| CN | 113542512 A | * | 10/2021 | .......... H04L 65/1104 |
| CN | 113612890 A | | 11/2021 | |
| CN | 114244813 A | | 3/2022 | |

* cited by examiner

*Primary Examiner* — Glenford J Madamba
(74) *Attorney, Agent, or Firm* — The Webb Law Firm

(57) ABSTRACT

A call exception processing method includes sending first target signaling to a server, where the first target signaling is used by a transmit end device to establish a call connection to a receive end device; receiving target exception information sent by the server. The target exception information indicates that the first target signaling is exceptional; and generating, based on the target exception information, second target signaling corresponding to the first target signaling, and sending the second target signaling to the server.

15 Claims, 5 Drawing Sheets

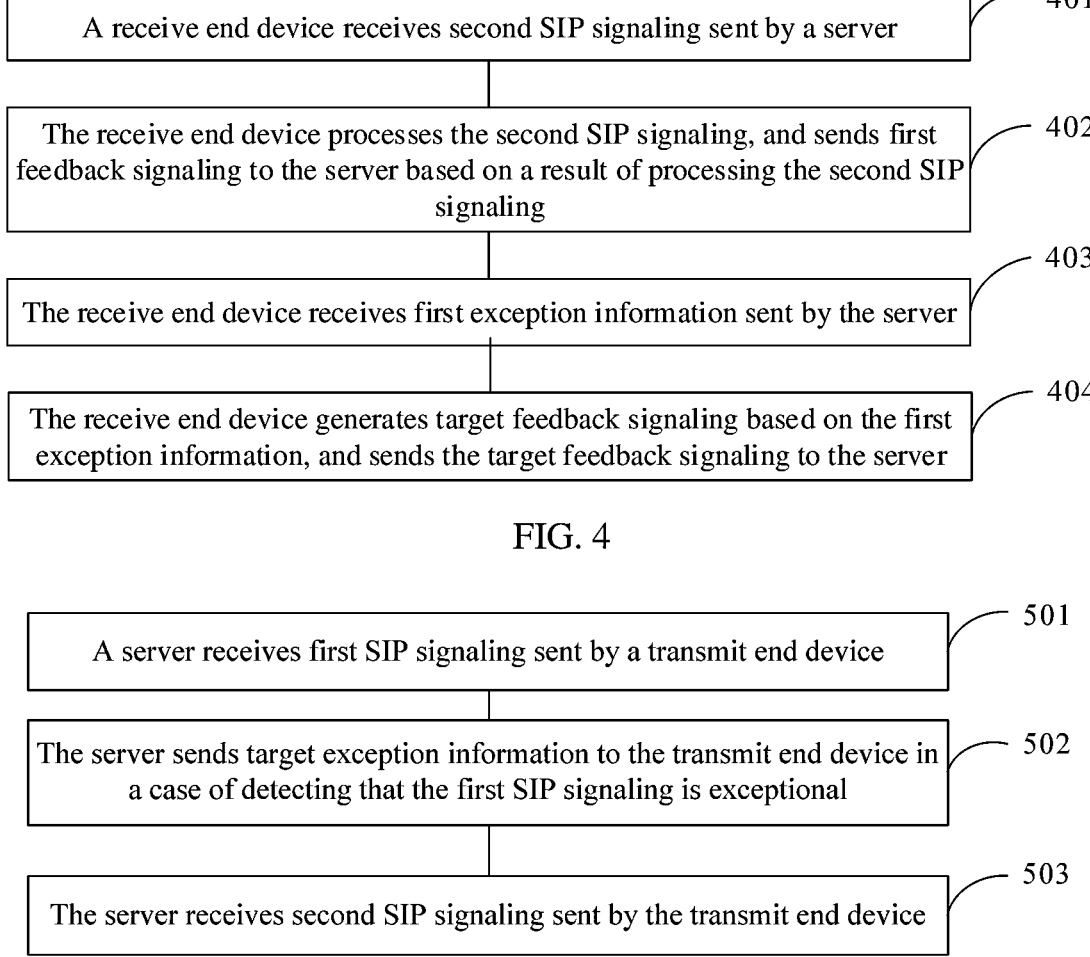

| A receive end device receives second SIP signaling sent by a server | ⌐ 401 |

| The receive end device processes the second SIP signaling, and sends first feedback signaling to the server based on a result of processing the second SIP signaling | ⌐ 402 |

| The receive end device receives first exception information sent by the server | ⌐ 403 |

| The receive end device generates target feedback signaling based on the first exception information, and sends the target feedback signaling to the server | ⌐ 404 |

FIG. 4

| A server receives first SIP signaling sent by a transmit end device | ⌐ 501 |

| The server sends target exception information to the transmit end device in a case of detecting that the first SIP signaling is exceptional | ⌐ 502 |

| The server receives second SIP signaling sent by the transmit end device | ⌐ 503 |

FIG. 5

CALL EXCEPTION PROCESSING METHOD AND ELECTRONIC DEVICE

CROSS-REFERENCE TO RELATED APPLICATIONS

This application is a Bypass Continuation Application of International Patent Application No. PCT/CN2022/130607, filed Nov. 8, 2022, and claims priority to Chinese Patent Application No. 202111312127.3, filed Nov. 8, 2021, the disclosures of which are hereby incorporated by reference in their entireties.

BACKGROUND OF THE INVENTION

Field of the Invention

This application pertains to the field of communication technologies, and particularly relates to a call exception processing method and apparatus, and an electronic device.

Description of Related Art

In long term evolution (LTE), an internet protocol multimedia subsystem (IMS) may provide a voice call service and a video call service, for example, a VoLTE service. An IMS call may be established by using a session initiation protocol (SIP), and call quality is negotiated by using a session description protocol (SDP), to implement end-to-end call control.

SUMMARY OF THE INVENTION

According to a first aspect, an embodiment of this application provides a call exception processing method, applied to an electronic device. The call exception processing method includes: sending first target signaling to a server, where the first target signaling is used by a transmit end device to establish a call connection to a receive end device; receiving target exception information sent by the server, where the target exception information indicates that the first target signaling is exceptional; and generating, based on the target exception information, second target signaling corresponding to the first target signaling, and sending the second target signaling to the server.

According to a second aspect, an embodiment of this application provides a call exception processing method, applied to a server. The method includes: receiving first target signaling sent by an electronic device, where the first target signaling is used by a transmit end device to establish a call connection to a receive end device; sending target exception information to the electronic device in a case of detecting that the first target signaling is exceptional, where the target exception information indicates that the first target signaling is exceptional; and receiving second target signaling sent by the electronic device, where the second target signaling is generated by the transmit end device based on the target exception information.

According to a third aspect, an embodiment of this application provides a call exception processing apparatus, applied to an electronic device. The call exception processing apparatus includes a sending module, a receiving module, and a generation module. The sending module is configured to send first target signaling to a server, where the first target signaling is used by a transmit end device to establish a call connection to a receive end device. The receiving module is configured to receive target exception information sent by the server, where the target exception information indicates that the first target signaling is exceptional. The generation module is configured to generate, based on the target exception information received by the receiving module, second target signaling corresponding to the first target signaling. The sending module is further configured to send, to the server, the second target signaling generated by the generation module.

According to a fourth aspect, an embodiment of this application provides a call exception processing apparatus, applied to a server. The call exception processing apparatus includes a receiving module and a sending module. The receiving module is configured to receive first target signaling sent by an electronic device, where the first target signaling is used by a transmit end device to establish a call connection to a receive end device. The sending module is configured to send target exception information to the electronic device in a case of detecting that the first target signaling is exceptional, where the target exception information indicates that the first target signaling is exceptional. The receiving module is further configured to receive second target signaling sent by the electronic device, where the second target signaling is generated by the transmit end device based on the target exception information.

According to a fifth aspect, an embodiment of this application provides an electronic device. The electronic device includes a processor, a memory, and a program or instructions stored in the memory and executable on the processor. When the program or the instructions are executed by the processor, steps of the method according to the first aspect are implemented.

According to a sixth aspect, an embodiment of this application provides a server. The server includes a processor, a memory, and a program or instructions stored in the memory and executable on the processor. When the program or the instructions are executed by the processor, steps of the method according to the second aspect are implemented.

According to a seventh aspect, an embodiment of this application provides a non-transitory readable storage medium. The non-transitory readable storage medium stores a program or instructions. When the program or the instructions are executed by a processor, steps of the method according to the first aspect or the second aspect are implemented.

According to an eighth aspect, an embodiment of this application provides a chip. The chip includes a processor and a communication interface, the communication interface is coupled to the processor, and the processor is configured to run a program or instructions, to implement the method according to the first aspect or the method according to the second aspect.

BRIEF DESCRIPTION OF THE DRAWINGS

FIG. 4 is a third schematic diagram of a call exception processing method according to an embodiment of this application;

FIG. 5 is a fourth schematic diagram of a call exception processing method according to an embodiment of this application;

DESCRIPTION OF THE INVENTION

The following clearly describes technical solutions in embodiments of this application with reference to accompanying drawings in embodiments of this application. It is clear that the described embodiments are some but not all of embodiments of this application. All other embodiments obtained by a person of ordinary skill in the art based on embodiments of this application shall fall within the protection scope of this application.

The terms "first", "second", and the like in this specification and the claims of this application are used to distinguish between similar objects instead of describing a specific sequence or order. It should be understood that, data used in such a way is interchangeable in proper circumstances, so that embodiments of this application can be implemented in a sequence other than the sequence illustrated or described herein. Objects classified by "first", "second", and the like are usually of a same type, and a quantify of objects is not limited. For example, there may be one or more first objects. In addition, in this specification and the claims, "and/or" represents at least one of connected objects, and a character "/" generally represents an "or" relationship between associated objects.

Figure 1:
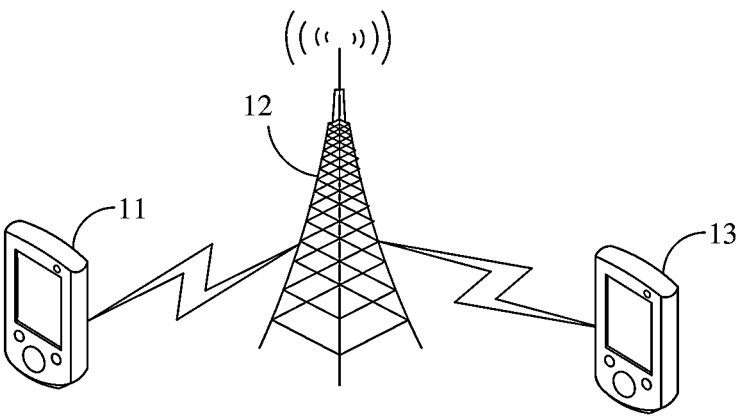
FIG. 1 is a block diagram of a wireless communication system to which embodiments of this application are applicable.

FIG. 1 is a block diagram of a wireless communication system to which embodiments of this application are applicable. The wireless communication system includes an electronic device 11, a server 12, and an electronic device 13.

The electronic device may be a terminal device, a terminal, or user equipment (UE). For example, the electronic device may be a terminal side device such as a mobile phone, a tablet personal computer, a laptop computer or a notebook computer, a personal digital assistant (PDA), a palmtop computer, a netbook, an ultra-mobile personal computer (UMPC), a mobile internet device (MID), a wearable device, a vehicle-mounted device, or pedestrian user equipment (PUE). The wearable device includes a smart watch, a bracelet, a headset, glasses, and the like. It should be noted that a type of the electronic device is not limited in embodiments of this application.

The server 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission reception point (TRP), or another suitable term in the field, provided that a same technical effect is achieved. The base station is not limited to a specific technical word.

With reference to the accompanying drawings, the following describes in detail a call exception processing method provided in embodiments of this application by using embodiments and application scenarios thereof.

Currently, an IMS is a basic solution for providing voice and video calls in LTE, and also provides a basic solution for implementing a 5th generation (5G) mobile communication technology voice solution. Currently, most operators in the world support IMS services, such as voice over long term evolution (VoLTE). However, the IMS may use a SIP to implement communication. Therefore, with the rise of VoLTE, a plurality of operators require that a TMS network is preferred for a call-related service, and a circuit switching (CS) network is used only provided that the TMS network is exceptional.

It should be noted that an SDP is a session description format and does not belong to a transmission protocol. In different circumstances, the SDP needs to use transmission protocols corresponding to the circumstances. The transmission protocols include a session announcement protocol (SAP), a session initiation protocol (SIP), a real-time streaming protocol (RTSP), multipurpose internet mail extensions (MIME), and a hyper text transfer protocol (HTTP). The SDP is also a text-based protocol. The SDP may ensure that a protocol is used with high scalability, so that an application scope of the SDP is wide. However, because the SDP does not support negotiation of session content or media coding, the SDP only describes media information in streaming media.

It should be noted that the IMS is essentially a network structure, and is used for end-to-end call control in the SIP. Because of simplicity, compatibility, modular design and third-party control of the SIP, the SIP may become a mainstream protocol in the internet-based communication market. Therefore, a SIP-based IMS framework may maximize use of internet technologies and protocols, inherit network technologies unique to a cellular mobile communication system, and fully refer to soft switch network technologies, so that the IMS can provide carrier-class quality of service (QoS) guarantee, effectively and flexibly charge services, and have a powerful capability of integrating various types of network integrated services. Therefore, the IMS system is used, so that a telecom operator can enter the mobile field at low costs, while a mobile operator can easily introduce new rich multimedia services, namely, full-service operation, without affecting original voice and SMS service quality.

An IMS call is established by using the SIP. Actually, a call manner (quality) is negotiated by using the SDP, and transmission of voice data is performed by using a real-time transport protocol (RTP). However, in the IMS call, an inter-terminal call may be exceptional because, in SIP signaling, a 0-row field in the SDP is excessively long or there is an irregular character, and thus call quality of an electronic device is poor. Based on this, this solution provides a method and an apparatus for detecting and controlling an IMS call based on an SDP. According to this solution, the call exception introduced by an excessively-long or irregular related field of the SDP in the IMS call may be optimized, a call success rate may be improved to a certain extent, and user call experience may be improved.

In a manner of embodiments of this application, a transmit end device may send first SIP signaling to a server. In a case that the first SIP signaling is exceptional, the transmit end device may receive target exception information that is sent by the server and that indicates that the first SIP signaling is exceptional, and the transmit end device may generate second SIP signaling based on the target exception information, and send the second SIP signaling to the server, so that the transmit end device establishes a call connection to a receive end device. According to this solution, problems that communication is exceptional and call quality of the transmit end device is poor, caused by a phenomenon that in an IMS call, a field in a specific row of fields in an SDP is excessively long or there is an irregular character, may be avoided, so that user experience is improved, and a call success rate of the transmit end device is improved.

In another manner of embodiments of this application, after receiving the second SIP signaling sent by the server, the receive end device may parse and process the second SIP signaling, to generate first feedback signaling, and send the first feedback signaling to the server. In a case that the first feedback signaling is exceptional, the receive end device may receive first exception information that is sent by the server and that indicates that the first feedback signaling is exceptional, and the receive end device may generate target feedback signaling based on the first exception information, and send the target feedback signaling to the server, so that the receive end device establishes the call connection to the transmit end device. According to this solution, problems that communication is exceptional and call quality of the receive end device is poor, caused by a phenomenon that in an IMS call, a field in a specific row of fields in an SDP is excessively long or there is an irregular character, may be avoided, so that user experience is improved, and a call success rate of the receive end device is improved.

Figure 2:
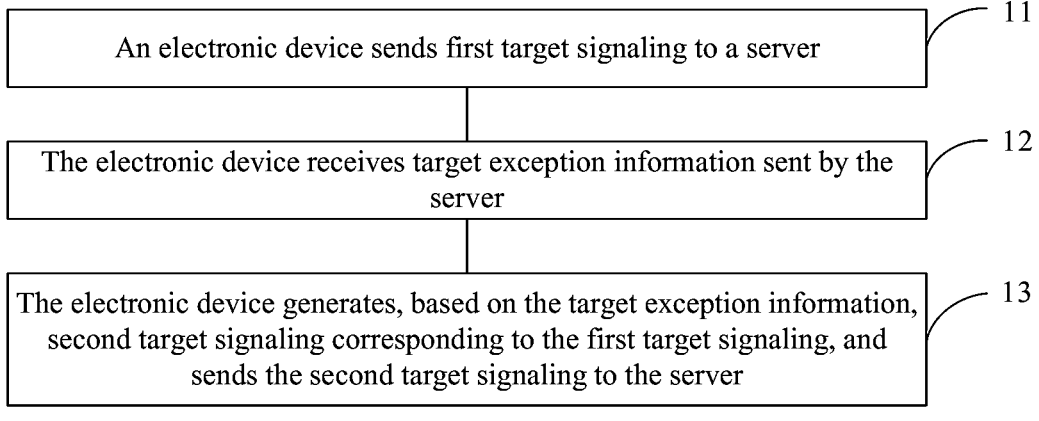
FIG. 2 is a first schematic diagram of a call exception processing method according to an embodiment of this application.

An embodiment of this application provides a call exception processing method. The method is applied to an electronic device. FIG. 2 is a flowchart of a call exception processing method according to an embodiment of this application. As shown in FIG. 2, the call exception processing method provided in this embodiment of this application may include the following steps 11 to 13.

Step 11: The electronic device sends first target signaling to a server.

In this embodiment of this application, the first target signaling is used by a transmit end device to establish a call connection to a receive end device.

Step 12: The electronic device receives target exception information sent by the server.

In this embodiment of this application, the target exception information indicates that the first target signaling is exceptional.

Step 13: The electronic device generates, based on the target exception information, second target signaling corresponding to the first target signaling, and sends the second target signaling to the server.

Optionally, in a first implementation of this embodiment of this application, the method is applied to the transmit end device, the first target signaling is first session initiation protocol SIP signaling, the first SIP signaling is used by the transmit end device to establish the call connection to the receive end device, and the first SIP signaling includes a header field and session description protocol SDP session information. The following describes, by using an implementation process (namely, an interaction process between the transmit end device and the server), the call exception processing method provided in this embodiment of this application. For example, the interaction process between the transmit end device and the server may include the following steps 201 to 203.

Figure 3:
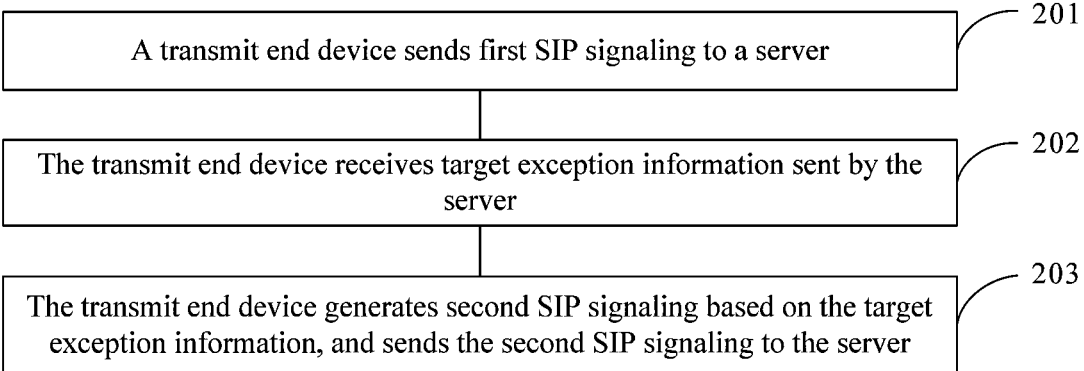
FIG. 3 is a second schematic diagram of a call exception processing method according to an embodiment of this application.

FIG. 3 is a flowchart of a call exception processing method according to an embodiment of this application. The method may be applied to a transmit end device. As shown in FIG. 3, the call exception processing method provided in this embodiment of this application may include the following steps 201 to 203.

Step 201: The transmit end device sends first SIP signaling to a server.

In this embodiment of this application, the first SIP signaling is used by the transmit end device to establish a call connection to a receive end device.

In this embodiment of this application, after a subscriber identity module (SIM) with an IMS capability is inserted, in a case that an electronic device needs to establish a call connection to another electronic device, the electronic device may be used as the transmit end device (for example, a mobile original (MO) device), to send the first SIP signaling to the server through a call module in the transmit end device, to establish a call connection to another electronic device (for example, a mobile terminated (MT) device).

Optionally, in this embodiment of this application, the first SIP signaling includes a header field and SDP session information.

Optionally, in this embodiment of this application, the header field of the first SIP signaling may include an INVITE field, an ACK field, a PRACK field, a BYE field, a CANCEL field, a REGISTER field, a OPTIONS field, and the like. INVITE is used by the transmit end device to initiate session request signaling to another terminal device to invite the another terminal device to join a session, and may also be used for updating a session after the session is established (in this case, INVITE is also referred to as Re-invite). ACK is used by the transmit end device to acknowledge to the server that a final response to the INVITE request has been received. PRACK indicates acknowledgment request signaling for response signaling. BYE indicates termination of an established session. CANCEL indicates that the request signaling is canceled before a final response to the request signaling is received, and the completed request signaling is not affected. REGISTER identifies address information that indicates that the transmit end device registers with a SIP server end and that is listed in a To field. OPTIONS identifies related information and functions that indicate to query a called party.

Optionally, in this embodiment of this application, the SDP session information includes a row v, a row o, a row s, a row i, a row u, a row e, a row p, a row c, a row b, a row t, a row r, a row z, a row k, a row a, and a row m. The row v represents a protocol version, the row o represents a creator, the row s represents a session name, the row i represents session information, the row u represents a uniform resource identifier (URI) description, the row e identifies an email address, the row p represents a telephone number, the row c represents connection information, the row b represents bandwidth information, the row t represents session activity time, the row r represents 0 or more repetitions, the row z represents a time zone adjustment, the row k represents an encryption key, the row a represents 0 or more session attribute rows, and the row m represents a media name or a transmission address.

Step 202: The transmit end device receives target exception information sent by the server.

In this embodiment of this application, the target exception information indicates that the first SIP signaling is exceptional.

Optionally, in this embodiment of this application, that the first SIP signaling is exceptional includes at least one of the following that: the header field of the first SIP signaling is exceptional, or the SDP session information is exceptional.

Optionally, in this embodiment of this application, that the header field of the first SIP signaling is exceptional includes at least one of the following that: writing of the header field is exceptional, a format of the header field is exceptional, a length of the header field is exceptional, or there is an exceptional character in the header field.

Optionally, in this embodiment of this application, that the SDP session information is exceptional includes at least one of the following that: field writing in the SDP session information is exceptional, a field format in the SDP session information is exceptional, a length of content in the SDP session information is exceptional, or there is an exceptional character in the content in the SDP session information.

In this embodiment of this application, after the transmit end device sends the first SIP signaling to the server, in a case that the header field and/or the SDP session information of the first SIP signaling are/is exceptional, the transmit end device may receive the target exception information sent by the server, so that the transmit end device may perform a corresponding operation based on the exception information.

Step 203: The transmit end device generates second SIP signaling based on the target exception information, and sends the second SIP signaling to the server.

In this embodiment of this application, after receiving the target exception information sent by the server, the transmit end device may regenerate, based on the target exception information, target signaling corresponding to the target exception information, and reassemble the target signaling and signaling that is in the first SIP signaling and that is not exceptional, to produce the second SIP signaling, so that the transmit end device may send the second SIP signaling to the server.

This embodiment of this application provides the call exception processing method. The transmit end device may send, to the server, the first SIP signaling for establishing the call connection to the receive end device, and receive the target exception information that is sent by the server and that indicates that the first SIP signaling is exceptional. Then, the transmit end device may generate, based on the target exception information, the second SIP signaling corresponding to the first target signaling, and send the second SIP signaling to the server. According to this solution, when establishing the call connection to the receive end device by using the first SIP signaling, the transmit end device may regenerate the second SIP signaling with reference to the exception information that is of the first SIP signaling and that is sent by the server, to establish the call connection to the receive end device by using the second SIP signaling. Therefore, problems that end-to-end communication is exceptional and call quality of the transmit end device is poor, caused by exceptional SIP signaling, may be avoided, so that a success rate of establishing a call by the transmit end device may be improved. This improves call quality of the transmit end device.

Optionally, in this embodiment of this application, the foregoing step 203 in which "the transmit end device generates second SIP signaling based on the target exception information" may be implemented through the following step 203a.

Step 203a: The transmit end device performs exception processing on the first SIP signaling based on an exception type indicated by the target exception information, to obtain the second SIP signaling.

In this embodiment of this application, the transmit end device regenerates, based on the exception type indicated by the target exception information sent by the server, the SDP session information or the SIP header field corresponding to the exception type, and reassembles the generated SDP session information or SIP header field and the signaling that is in the first SIP signaling and that is not exceptional, to generate the second SIP signaling, so that the transmit end device may send the second SIP signaling to the server, and the call connection is established between the transmit end device and the receive end device.

Optionally, in this embodiment of this application, the exception type indicated by the target exception information may be any one of the following: Writing of the header field of the first SIP signaling is exceptional, a format of the header field of the first SIP signaling is exceptional, a length of the header field of the first SIP signaling is exceptional, there is an exceptional character in the header field of the first SIP signaling, field writing in the SDP session information is exceptional, a field format in the SDP is exceptional, a length of content in the SDP is exceptional, and there is an exceptional character in the content in the SDP.

In this embodiment of this application, the transmit end device may generate, based on the exception type indicated by the target exception information, the SIP header field or the SDP session information corresponding to the exception type, and then assemble the regenerated SIP header field or SDP session information and the signaling that is in the first SIP signaling and that is not exceptional, to obtain the second SIP signaling. Because in a process of sending the SIP signaling by the transmit end device, a mechanism for detecting and retransmitting the SIP header field and the SDP session information is added, a problem that the call is unsuccessfully established, caused by exception information in the first SIP signaling, namely, a phenomenon that in the SIP signaling, a field in a specific row of fields in an SDP is excessively long or there is an irregular character, is avoided. Therefore, efficiency of generating SIP signaling by the transmit end device is improved, and a success rate of establishing a call between the transmit end device and the receive end device is improved.

Optionally, in this embodiment of this application, after step 203, the call exception processing method provided in this embodiment of this application further includes the following steps 301 and 302.

Step 301: The transmit end device receives target feedback signaling sent by the server.

Optionally, in this embodiment of this application, the target feedback signaling is SIP signaling that is sent by the receive end device after processing the second SIP signaling.

In this embodiment of this application, after the transmit end device sends the second SIP signaling to the server, the server may send the second SIP signaling to the receive end device, and then the receive end device parses and processes the second SIP signaling to obtain the target feedback signaling, and sends the target feedback signaling to the server, so that the server feeds back a result of processing the second SIP signaling to the transmit end device.

Optionally, in this embodiment of this application, the target feedback signaling is response signaling, and the target feedback signaling indicates that the receive end device agrees to establish the call connection to the transmit end device.

Step 302: The transmit end device establishes the call connection to the receive end device based on the target feedback signaling.

In this embodiment of this application, after receiving the target feedback signaling, the transmit end device may process and parse the target feedback signaling, so that the transmit end device may establish the call connection to the receive end device based on the target feedback signaling.

In this embodiment of this application, the target feedback signaling is SIP signaling that is sent by the receive end device after processing the second SIP signaling, and the second SIP signaling is signaling that is regenerated with reference to the exception information of the SIP signaling. Therefore, the transmit end device may successfully establish the call connection to the receive end device based on the target feedback signaling sent by the receive end device, that is, improve the success rate of establishing the call between the transmit end device and the receive end device.

Optionally, in a second implementation of this embodiment of this application, the method is applied to the receive end device, the first target signaling is first feedback signaling, and the first feedback signaling indicates a result of processing, by the receive end device, SIP signaling sent by the transmit end device. The following describes, by using an implementation process (namely, an interaction process between the transmit end device and the server), the call exception processing method provided in this embodiment of this application. For example, the interaction process between the transmit end device and the server may include the following steps 401 to 404.

FIG. 4 is a flowchart of a call exception processing method according to an embodiment of this application. The method may be applied to a receive end device. As shown in FIG. 4, the call exception processing method provided in this embodiment of this application may include the following steps 401 to 404.

Step 401: A receive end device receives second SIP signaling sent by a server.

In this embodiment of this application, the second SIP signaling is used by the transmit end device to establish a call connection to the receive end device.

In this embodiment of this application, after the transmit end device sends the second SIP signaling to the server, the server may send the second SIP signaling to the receive end device, so that the receive end device may establish the call connection to the transmit end device by using the second SIP signaling.

Step 402: The receive end device processes the second SIP signaling, and sends first feedback signaling to the server based on a result of processing the second SIP signaling.

In this embodiment of this application, the receive end device may parse and process the second SIP signaling sent by the transmit end device through the server, and the receive end device may generate the first feedback signaling based on the result of processing the second SIP signaling, so that the receive end device may send the first feedback signaling to the server.

Optionally, in this embodiment of this application, the first feedback signaling is response signaling, and the first feedback signaling is used by the receive end device to respond, through the server, to a call request initiated by the transmit end device.

Optionally, in this embodiment of this application, the first feedback signaling may include Trying signaling, Ringing signaling, Call is Being Forwarded Signaling, OK signaling, Moved Temporarily signaling, Bad Request signaling, Unauthorized Signaling, Forbidden signaling, Not Found signaling, 408 Request Timeout signaling, Temporarily Unavailable signaling, Busy Here signaling, Server Time-out signaling, and Busy Everywhere signaling.

Step 403: The receive end device receives first exception information sent by the server.

In this embodiment of this application, the first exception information indicates that the first feedback signaling is exceptional.

In this embodiment of this application, after the receive end device sends the first feedback signaling to the server, in a case that there is exception information in the first feedback signaling, the receive end device may receive the first exception information sent by the server.

Optionally, in this embodiment of this application, that the first feedback signaling is exceptional includes at least one of the following that: a header field of the first feedback signaling is exceptional, or SDP session information of the first feedback signaling is exceptional.

Optionally, in this embodiment of this application, that the header field of the first feedback signaling is exceptional includes at least one of the following that: writing of the header field is exceptional, a format of the header field is exceptional, a length of the header field is exceptional, or there is an exceptional character in the header field.

Optionally, in this embodiment of this application, that the SDP session information of the first feedback signaling is exceptional includes at least one of the following that: field writing in the SDP session information is exceptional, a field format in the SDP session information is exceptional, a length of content in the SDP session information is exceptional, or there is an exceptional character in the content in the SDP session information.

Step 404: The receive end device generates target feedback signaling based on the first exception information, and sends the target feedback signaling to the server.

In this embodiment of this application, the receive end device may regenerate, based on the first exception information, first target signaling corresponding to the first exception information, and reassemble the generated first target signaling and the signaling that is in the first feedback signaling and that is not exceptional, and the target feedback signaling may be generated, so that the receive end device sends the target feedback signaling to the server.

In this embodiment of this application, in a case that the header field and/or the SDP session information in the first feedback signaling are/is exceptional, the receive end device may receive target exception information sent by the server, and the receive end device may generate the target feedback signaling based on the exception information, and send the target feedback signaling to the server, so that the receive end device establishes the call connection to the transmit end device.

Optionally, in this embodiment of this application, the foregoing step 404 in which "the receive end device generates target feedback signaling based on the first exception information" may be implemented through the following step 404a.

Step 404a: The receive end device performs exception processing on the first feedback signaling based on an exception type indicated by the first exception information, to obtain the target feedback signaling.

In this embodiment of this application, the receive end device regenerates, based on the exception type indicated by the target exception information sent by the server, the SDP session information or the SIP header field corresponding to the exception type, and reassembles the generated SDP session information or SIP header field and the signaling that is in the first feedback signaling and that is not exceptional, to generate the target feedback signaling, so that the receive end device may send the second SIP signaling to the server, and the call connection is established between the receive end device and the transmit end device.

Optionally, in this embodiment of this application, the exception type indicated by the target exception information may be any one of the following: Writing of the header field of the first feedback signaling is exceptional, a format of the header field of the first feedback signaling is exceptional, a length of the header field of the first feedback signaling is exceptional, there is an exceptional character in the header field of the first feedback signaling, field writing in the SDP of the first feedback signaling is exceptional, a field format in the SDP of the first feedback signaling is exceptional, a length of content in the SDP of the first feedback signaling is exceptional, and there is an exceptional character in the content in the SDP of the first feedback signaling.

In this embodiment of this application, the receive end device may generate, based on the exception type indicated by the target exception information, the SIP header field or the SDP session information corresponding to the exception type, and then assemble the regenerated SIP header field or SDP session information and the signaling that is in the first SIP signaling and that is not exceptional, to obtain the target feedback signaling. Because in a process of sending the feedback signaling by the receive end device, a mechanism for detecting and retransmitting the SIP header field and the SDP session information is added, a problem that the call is unsuccessfully established, caused by exception information in the first feedback signaling, is avoided. Therefore, efficiency of generating SIP signaling by the receive end device is improved, and a success rate of establishing a call between the transmit end device and the receive end device is improved.

This embodiment of this application provides the call exception processing method. The receive end device may send, to the server, the first SIP signaling for a request that responds to establishing the call connection to the receive end device, and receive the first exception information that is sent by the server and that indicates that the first feedback signaling is exceptional. Then, the receive end device may generate the target feedback signaling based on the first exception information, and send the target feedback signaling to the server. According to this solution, when establishing the call connection to the transmit end device by using the first feedback signaling, the receive end device may regenerate the target feedback signaling with reference to the exception information that is of the first feedback signaling and that is sent by the server, to establish the call connection to the transmit end device by using the target feedback signaling. Therefore, problems that end-to-end communication is exceptional and call quality of the receive end device is poor, caused by exceptional feedback signaling, may be avoided, so that a success rate of establishing a call by the receive end device may be improved. This improves call quality of the receive end device.

Optionally, in this embodiment of this application, the foregoing step 13 may be implemented through the following step 14.

Step 14: The electronic device performs exception processing on the first target signaling based on the exception type indicated by the target exception information, to obtain the second target signaling.

It should be noted that for descriptions of the foregoing step 14, refer to descriptions in Embodiment 1 and Embodiment 2 above. Details are not described herein again.

This embodiment of this application provides the call exception method. After sending the first target signaling for establishing the call connection to the server, the electronic device may regenerate the second target signaling with reference to the target exception information sent by the server. Therefore, when the transmit end device establishes the call connection to the receive end device, problems that end-to-end communication is exceptional and call quality of the transmit end device is poor, caused by a phenomenon that in the SIP signaling, a field in a specific row of fields in the SDP is excessively long or there is an irregular character, may be avoided, so that a success rate of establishing a call by the electronic device may be improved. This improves call quality of the electronic device.

Optionally, in a third implementation of this embodiment of this application, this embodiment of this application provides the call exception processing method. The method is applied to the server. FIG. 5 is a flowchart of a call exception processing method according to an embodiment of this application. As shown in FIG. 5, the call exception processing method provided in this embodiment of this application may include the following steps 501 to 503.

Step 501: The server receives first SIP signaling sent by a transmit end device.

In this embodiment of this application, the first SIP signaling is used by the transmit end device to establish a call connection to a receive end device.

Step 502: The server sends target exception information to the transmit end device in a case of detecting that the first SIP signaling is exceptional.

In this embodiment of this application, the target exception information indicates that the first SIP signaling is exceptional.

In this embodiment of this application, after receiving the first SIP signaling, the server may detect a header field and SDP session information of the first SIP signaling. In a case that the first SIP signaling is exceptional, the server sends the target exception information to the transmit end device.

Optionally, in this embodiment of this application, the target exception information includes at least one of the following that: a header field of first feedback signaling is exceptional, or SDP session information of the first feedback signaling is exceptional.

Optionally, in this embodiment of this application, that the header field of the first feedback signaling is exceptional includes at least one of the following that: writing of the header field is exceptional, a format of the header field is exceptional, a length of the header field is exceptional, or there is an exceptional character in the header field.

Optionally, in this embodiment of this application, that the SDP session information of the first feedback signaling is exceptional includes at least one of the following that: field writing in the SDP session information is exceptional, a field format in the SDP session information is exceptional, a length of content in the SDP session information is exceptional, or there is an exceptional character in the content in the SDP session information.

Step 503: The server receives second SIP signaling sent by the transmit end device.

In this embodiment of this application, the second SIP signaling is generated by the transmit end device based on the target exception information.

In this embodiment of this application, after sending the target exception information to the transmit end device, the server may receive the second SIP signaling sent by the transmit end device.

Optionally, in this embodiment of this application, after step 503, the call exception processing method provided in this embodiment of this application further includes the following steps 601 and 602.

Step 601: The server sends the second SIP signaling to the receive end device in a case of detecting that the second SIP signaling is not exceptional.

In this embodiment of this application, the server may parse and process the second SIP signaling. In a case that the second SIP signaling is not exceptional, the server sends the second SIP signaling to the receive end device.

Step 602: The server receives the first feedback signaling sent by the receive end device, and sends the first feedback signaling to the transmit end device.

In this embodiment of this application, the first feedback signaling is SIP signaling that is sent by the receive end device after processing the second SIP signaling.

In this embodiment of this application, after sending the second SIP signaling to the receive end device, the server may receive the first feedback signaling generated by the receive end device by processing and parsing based on the second SIP signaling, and send the first feedback signaling to the transmit end device, so that the receive end device establishes the call connection to the transmit end device. Therefore, problems that end-to-end communication is exceptional and call quality of the receive end device is poor, caused by a phenomenon that in the first feedback signaling, a field in a specific row in fields in an SDP is excessively long or there is an irregular character, may be avoided, so that a success rate of establishing a call by the receive end device may be improved. This improves call quality of the receive end device.

Optionally, in this embodiment of this application, after "the server receives the first feedback signaling sent by the receive end device" in step 602, the call exception processing method provided in this embodiment of this application further includes the following steps 701 and 702.

Step 701: The server sends first exception information to the receive end device in a case of detecting that the first feedback signaling is exceptional.

In this embodiment of this application, the first exception information indicates that the first feedback signaling is exceptional.

Optionally, in this embodiment of this application, the first exception information includes at least one of the following that: a header field of the first feedback signaling is exceptional, or SDP session information of the first feedback signaling is exceptional.

Optionally, in this embodiment of this application, that the header field of the first feedback signaling is exceptional includes at least one of the following that: writing of the header field is exceptional, a format of the header field is exceptional, a length of the header field is exceptional, or there is an exceptional character in the header field.

Optionally, in this embodiment of this application, that the SDP session information of the first feedback signaling is exceptional includes at least one of the following that: field writing in the SDP session information is exceptional, a field format in the SDP session information is exceptional, a length of content in the SDP session information is exceptional, or there is an exceptional character in the content in the SDP session information.

Step 702: The server receives target feedback signaling sent by the receive end device, and sends the target feedback signaling to the transmit end device.

In this embodiment of this application, the target feedback signaling is generated by the receive end device based on the first exception information, and the target feedback signaling is used by the transmit end device to establish the call connection to the receive end device.

In this embodiment of this application, after receiving the target feedback signaling sent by the receive end device, the server detects the target feedback signaling, and sends the target feedback signaling to the transmit end device, so that the call connection is established between the receive end device and the transmit end device.

This embodiment of this application provides the call exception processing method. The method is applied to the server. After receiving the first SIP signaling sent by the transmit end device, the server may detect the first SIP signaling. In a case that the first SIP signaling is exceptional, the server may send the first exception information to the transmit end device. Then, the server may receive the second SIP signaling generated by the transmit end device based the first exception information, and send the second SIP signaling to the receive end device, to receive, based on the second SIP signaling, the first SIP signaling generated by the receive end device. Then, the server may detect the first SIP signaling. In a case that the first feedback signaling is exceptional, the server may send the target exception information to the receive end device, to receive, based on the target exception information, the target feedback signaling generated by the receive end device. In this way, when the transmit end device sends call request signaling and the receive end device sends response call request signing, the server may detect the call request signaling and the response call request signing. Therefore, problems that end-to-end communication is exceptional and call quality of the receive end device is poor, caused by a phenomenon that in the call request signaling and the response call request signing, a field in a specific row of fields in an SDP is excessively long or there is an irregular character, are avoided, so that a success rate of establishing an end-to-end call may be improved. This improves end-to-end call quality.

Figure 6:
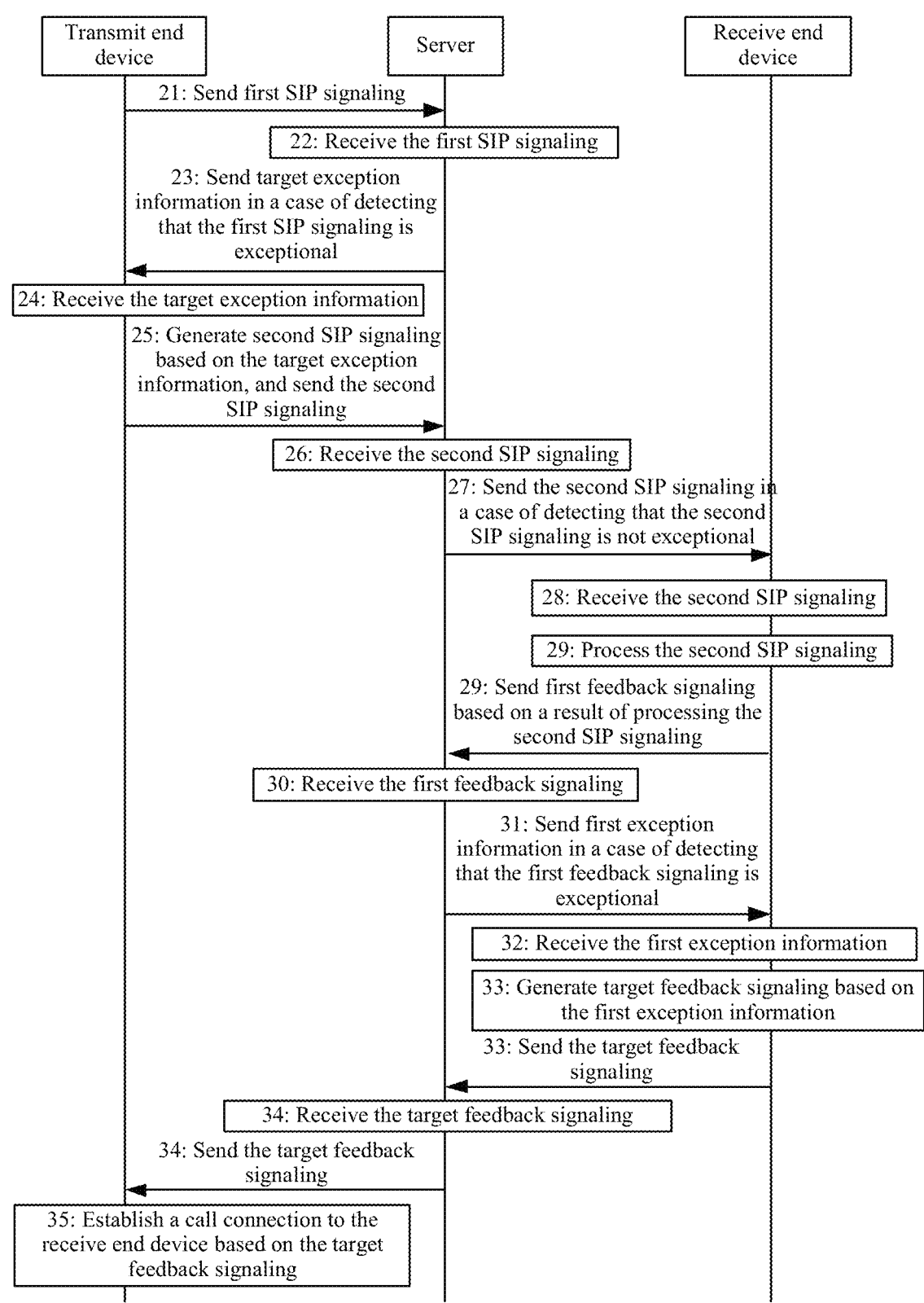
FIG. 6 is a fifth schematic diagram of a call exception processing method according to an embodiment of this application.

Optionally, in a fourth implementation of this embodiment of this application, this embodiment of this application provides the call exception processing method. FIG. 6 is a flowchart of a call exception processing method according to an embodiment of this application. As shown in FIG. 6, the call exception processing method provided in this embodiment of this application may include the following steps 21 to 35.

The following describes, by using an interaction embodiment, the call method provided in this embodiment of this application.

Step 21: A transmit end device sends first SIP signaling to a server.

Step 22: The server receives the first SIP signaling sent by the transmit end device.

Step 23: Send target exception information to the transmit end device in a case of detecting that the first SIP signaling is exceptional.

Step 24: The transmit end device receives the target exception information sent by the server.

Step 25: The transmit end device generates second SIP signaling based on the target exception information, and sends the second SIP signaling to the server.

Step 26: The server receives the second SIP signaling sent by the transmit end device.

Step 27: The server sends the second SIP signaling to a receive end device in a case of detecting that the second SIP signaling is not exceptional.

Step 28: The receive end device receives the second SIP signaling sent by the server.

Step 29: The receive end device processes the second SIP signaling, and sends first feedback signaling to the server based on a result of processing the second SIP signaling.

Step 30: The server receives the first feedback signaling sent by the receive end device.

Step 31: The server sends first exception information to the receive end device in a case of detecting that the first feedback signaling is exceptional.

Step 32: The receive end device receives the first exception information sent by the server.

Step 33: The receive end device generates target feedback signaling based on the first exception information, and sends the target feedback signaling to the server.

Step 34: The server receives the target feedback signaling sent by the receive end device, and sends the target feedback signaling to the transmit end device.

Step 35: The transmit end device receives the target feedback signaling sent by the server, and establishes a call connection to the receive end device based on the target feedback signaling.

It should be noted that for descriptions of the foregoing step 21 to step 35, refer to descriptions in Embodiment 1 to Embodiment 3. Details are not described herein again.

This embodiment of this application provides the call exception processing method. In a case that the transmit end device needs to establish the call connection to the receive end device, the transmit end device first sends the first SIP signaling to the server, to send call request signaling to the receive end device. After receiving the first SIP signaling sent by the transmit end device and detecting the first SIP signaling, in a case that there is no exception information in the first SIP signaling, the server sends the first SIP signaling to the receive end device to establish the call connection; or in a case that there is exception information in the first SIP signaling, the server sends the first SIP signaling to the transmit end device, so that the transmit end device may regenerate the second SIP signaling based on the exception information; and sends the second SIP signaling to the server. After receiving the second SIP signaling, the server detects the second SIP signaling, and in a case that there is no exception information in the second SIP signaling, sends the second SIP signaling to the receive end device. After receiving the second SIP signaling sent by the server, the receive end device parses and processes the second SIP signaling, to generate the first feedback signaling, and sends the first feedback signaling to the server. After receiving the first feedback signaling, the server detects the first feedback signaling, and in a case that there is no exception information in the first feedback signaling, sends the first feedback signaling to the transmit end device, to establish the call connection; or in a case that there is exception information in the first feedback signaling, sends the first feedback signaling to the receive end device, so that the receive end device may regenerate the target feedback signaling based on the exception information, and send the target feedback signaling to the server. After receiving the target feedback signaling, the server detects the target feedback signaling, and in a case that there is no exception information in the target feedback signaling, sends the target feedback signaling to the transmit end device, to successfully establish the call connection between the transmit end device and the receive end device.

It should be noted that the call exception processing method provided in this embodiment of this application may be executed by a call exception processing apparatus or a control module that is in the call exception processing apparatus and that is used to perform the call exception processing method.

Figure 7:
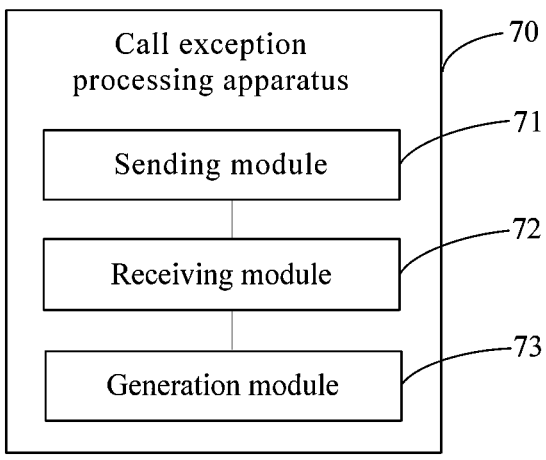
FIG. 7 is a first schematic diagram of a structure of a call exception processing apparatus according to an embodiment of this application.

FIG. 7 is a schematic diagram of a possible structure of a call exception processing apparatus according to an embodiment of this application. The call exception processing apparatus is applied to an electronic device. As shown in FIG. 7, the call exception processing apparatus 70 may include a sending module 71, a receiving module 72, and a generation module 73.

The sending module 71 is configured to send first target signaling to a server, where the first target signaling is used by a transmit end device to establish a call connection to a receive end device. The receiving module 72 is configured to receive target exception information sent by the server, where the target exception information indicates that the first target signaling is exceptional. The generation module 73 is configured to generate second target signaling based on the target exception information received by the receiving module 72. The sending module 71 is further configured to send, to the server, the second target signaling generated by the generation module 73.

This embodiment of this application provides the call exception apparatus. After sending the first target signaling for establishing the call connection to the server, the electronic device may regenerate, with reference to the target exception information sent by the server, the second target signaling corresponding to the first target signaling. Therefore, when the transmit end device establishes the call connection to the receive end device, problems that end-to-end communication is exceptional and call quality of the transmit end device is poor, caused by a phenomenon that in SIP signaling, a field in a specific row of fields in an SDP is excessively long or there is an irregular character, may be avoided, so that a success rate of establishing a call by the electronic device may be improved. This improves call quality of the electronic device.

In a possible implementation, the first target signaling is first session initiation protocol SIP signaling, the first SIP signaling is used by the transmit end device to establish the call connection to the receive end device, and the first SIP signaling includes a header field and session description protocol SDP session information. Alternatively, the first target signaling is first feedback signaling, and the first feedback signaling indicates a result of processing, by the receive end device, SIP signaling sent by the transmit end device.

In a possible implementation, the generation module 73 is configured to perform exception processing on the first target signaling based on an exception type indicated by the target exception information received by the receiving module 72, to obtain the second target signaling.

The call exception processing apparatus provided in this embodiment of this application can implement the processes implemented by the transmit end device in the foregoing method embodiments, and can achieve a same technical effect. To avoid repetition, details are not described herein again.

Figure 8:
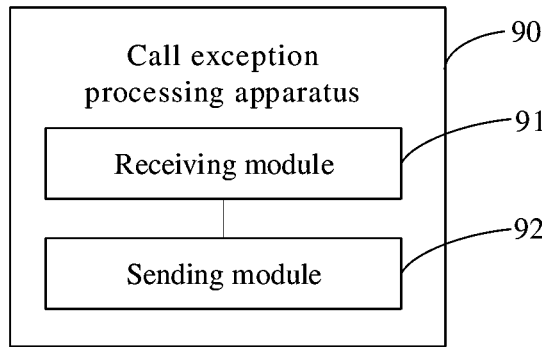
FIG. 8 is a second schematic diagram of a structure of a call exception processing apparatus according to an embodiment of this application.

FIG. 8 is a schematic diagram of a possible structure of a call exception processing apparatus according to an embodiment of this application. The call exception processing apparatus is applied to a server. As shown in FIG. 8, the call exception processing apparatus 90 may include a receiving module 91, and a sending module 92.

The receiving module 91 is configured to receive first target signaling sent by a transmit end device, where the first target signaling is used by the transmit end device to establish a call connection to a receive end device. The sending module 92 is configured to send target exception information to the transmit end device in a case of detecting that the first target signaling is exceptional, where the target exception information indicates that the first target signaling is exceptional. The receiving module 91 is further configured to receive second target signaling sent by the transmit end device, where the second target signaling is generated by the transmit end device based on the target exception information.

This embodiment of this application provides the call exception processing apparatus. When the transmit end device sends call request signaling and the receive end device sends response call request signing, the server may detect the call request signaling and the response call request signing. Therefore, problems that end-to-end communication is exceptional and call quality of the receive end device is poor, caused by a phenomenon that in the call request signaling and the response call request signing, a field in a specific row of fields in an SDP is excessively long or there is an irregular character, are avoided, so that a success rate of establishing an end-to-end call may be improved. This improves end-to-end call quality.

In a possible implementation, the sending module 92 is further configured to: after the receiving module 91 receives the second target signaling sent by an electronic device, send the second target signaling to the electronic device in a case of detecting that the second target signaling is not exceptional. The receiving module 91 is further configured to receive first feedback signaling sent by the electronic device. The sending module 92 is further configured to send, to the electronic device, the first feedback signaling received by the receiving module 91, where the first feedback signaling is SIP signaling that is sent by the electronic device after processing the second SIP signaling.

In a possible implementation, the sending module 92 is further configured to: after the receiving module 91 receives the first feedback signaling sent by the electronic device, send first exception information to the electronic device in a case of detecting that the first feedback signaling is exceptional, where the first exception information indicates that the first feedback signaling is exceptional. The receiving module 91 is further configured to receive target feedback signaling sent by the electronic device. The sending module 92 is further configured to send, to the electronic device, the target feedback signaling received by the receiving module 91, where the target feedback signaling is generated by the electronic device based on the first exception information, and the target feedback signaling is used by the transmit end device to establish the call connection to the receive end device.

The call exception processing apparatus in this embodiment of this application may be an apparatus, or may be a component, an integrated circuit, or a chip in a server.

The call exception processing apparatus provided in this embodiment of this application can implement processes implemented by the server in the foregoing method embodiments, and can achieve a same technical effect. To avoid repetition, details are not described herein again.

Figure 9:
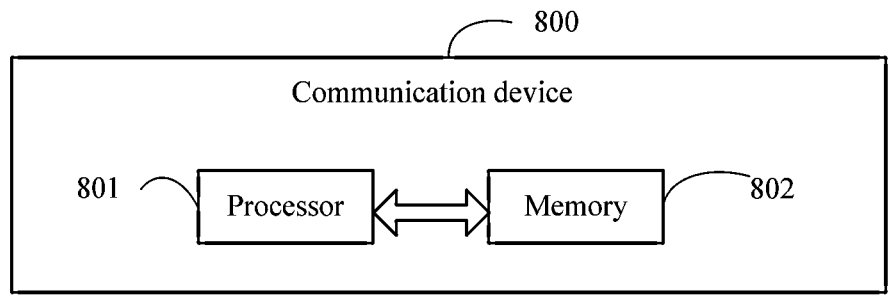
FIG. 9 is a schematic diagram of a hardware structure of a communication device according to an embodiment of this application.

Optionally, as shown in FIG. 9, an embodiment of this application further provides a communication device 800. The communication device 800 includes a processor 801, a memory 802, and a program or instructions stored in the memory 802 and executable on the processor 801. For example, when the communication device 800 is an electronic device, and the program or the instructions are executed by the processor 801, the processes performed by the transmit end device or the receive end device in the foregoing method embodiments are implemented, and a same technical effect can be achieved. When the communication device 800 is a server, and the program or instructions are executed by the processor 801, the processes performed by the server in the foregoing method embodiments are implemented, and a same technical effect can be achieved. To avoid repetition, details are not described herein again.

It should be noted that the electronic device in this embodiment of this application includes the foregoing mobile electronic device and the foregoing non-mobile electronic device.

Figure 10:
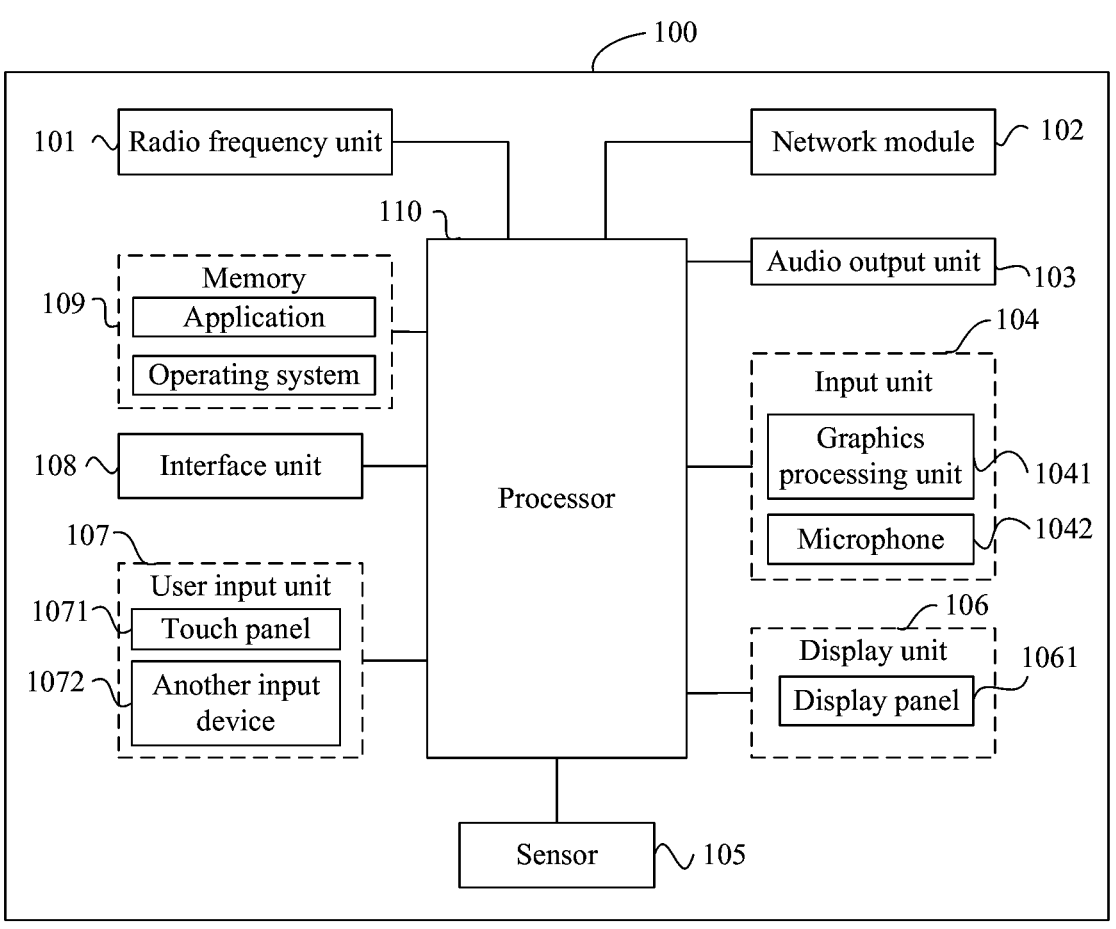
FIG. 10 is a schematic diagram of a hardware structure of an electronic device according to an embodiment of this application.

FIG. 10 is a schematic diagram of a hardware structure of an electronic device according to an embodiment of this application. The electronic device may be a transmit end device or a receive end device.

The electronic device 100 includes but is not limited to components: a radio frequency unit 101, a network module 102, an audio output unit 103, an input unit 104, a sensor 105, a display unit 106, a user input unit 107, an interface unit 108, a memory 109, a processor 110, and the like.

A person skilled in the art may understand that the electronic device 100 may further include a power supply (such as a battery) that supplies power to each component. The power supply may be logically connected to the processor 110 by using a power supply management system, to implement functions such as charging and discharging management, and power consumption management by using the power supply management system. The structure of the electronic device shown in FIG. 10 does not constitute a limitation on the electronic device. The electronic device may include components more or fewer than those shown in the diagram, a combination of some components, or different component arrangements. Details are not described herein.

When the electronic device is the transmit end device, the radio frequency unit 101 is configured to send first target signaling to a server, where the first target signaling is used by the transmit end device to establish a call connection to a receive end device. The radio frequency unit 101 is configured to receive target exception information sent by the server, where the target exception information indicates that the first target signaling is exceptional. The processor 110 is configured to generate second target signaling based on the target exception information. The radio frequency unit 101 is further configured to send the second target signaling to the server.

This embodiment of this application provides the transmit end device. After sending the first target signaling for establishing the call connection to the server, the electronic device may regenerate, with reference to the target exception information sent by the server, the second target signaling corresponding to the first target signaling. Therefore, when the transmit end device establishes the call connection to the receive end device, problems that end-to-end communication is exceptional and call quality of the transmit end device is poor, caused by a phenomenon that in SIP signaling, a field in a specific row of fields in an SDP is excessively long or there is an irregular character, may be avoided, so that a success rate of establishing a call by the electronic device may be improved. This improves call quality of the electronic device.

Figure 11:
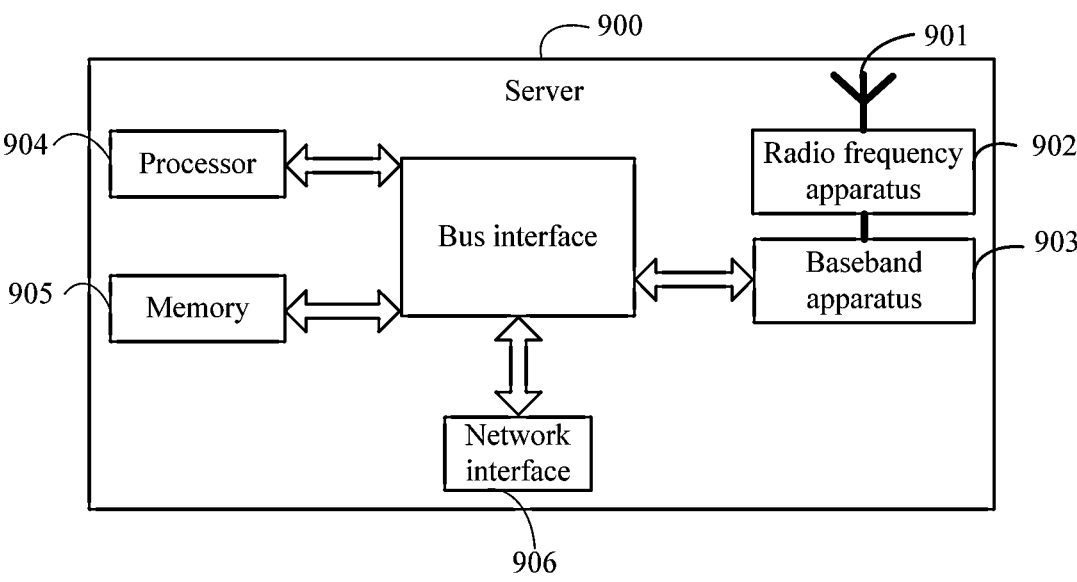
FIG. 11 is a schematic diagram of a hardware structure of a server according to an embodiment of this application.

FIG. 11 is a schematic diagram of a hardware structure of a server for implementing an embodiment of this application.

The server 900 includes but is not limited to an antenna 901, a radio frequency apparatus 902, and a baseband apparatus 903. The antenna 901 is connected to the radio frequency apparatus 902. In an uplink direction, the radio frequency apparatus 902 receives information through the antenna 901, and sends the received information to the baseband apparatus 903 for processing. In a downlink direction, the baseband apparatus 903 processes information that needs to be sent, and sends processed information to the radio frequency apparatus 902. The radio frequency apparatus 902 processes the received information, and sends processed information through the antenna 901.

The foregoing call exception processing apparatus may be located in the baseband apparatus 903, and the method executed by the control node in the foregoing embodiments may be implemented in the baseband apparatus 903. The baseband apparatus 903 includes a processor 904 and a memory 905.

For example, the baseband apparatus 903 may include at least one baseband board. A plurality of chips are disposed on the baseband board. As shown in FIG. 11, one chip is, for example, the processor 904, and is connected to the memory 905, to invoke a program in the memory 905, to perform control node operations shown in the foregoing method embodiments.

The baseband apparatus 903 may further include a network interface 906, configured to exchange information with the radio frequency apparatus 902. For example, the interface is a common public radio interface (CPRI).

The radio frequency apparatus 902 is configured to: receive first target signaling sent by an electronic device, where the first target signaling is used by a transmit end device to establish a call connection to a receive end device; send target exception information to the electronic device in a case of detecting that the first target signaling is exceptional, where the target exception information indicates that the first target signaling is exceptional; and receive second target signaling sent by the electronic device, where the second target signaling is generated by the transmit end device based on the target exception information.

This embodiment of this application provides the server. When the transmit end device sends call request signaling and the receive end device sends response call request signing, the server may detect the call request signaling and the response call request signing. Therefore, problems that end-to-end communication is exceptional and call quality of the receive end device is poor, caused by a phenomenon that in the call request signaling and the response call request signing, a field in a specific row of fields in an SDP is excessively long or there is an irregular character, are avoided, so that a success rate of establishing an end-to-end call may be improved. This improves end-to-end call quality.

The server provided in this embodiment of this application can implement processes implemented by the server in the foregoing method embodiments, and achieve a same technical effect. To avoid repetition, details are not described herein again.

For example, the server in this embodiment of this application further includes instructions or a program stored in the memory 905 and executable on the processor 904. The processor 904 invokes the instructions or the program in the memory 905 to execute the foregoing methods executed by the modules or units, and achieves a same technical effect. To avoid repetition, details are not described herein again.

An embodiment of this application further provides a non-transitory readable storage medium. The non-transitory readable storage medium stores a program or instructions. When the program or the instructions is/are executed by a processor, the processes of the foregoing method embodiments are implemented, and a same technical effect can be achieved. To avoid repetition, details are not described herein again.

The processor is the processor in the foregoing embodiments. The non-transitory readable storage medium includes a non-transitory computer-readable storage medium, such as a computer read-only memory (ROM), a random access memory (RAM), a magnetic disk, or an optical disc.

An embodiment of this application further provides a chip. The chip includes a processor and a communication interface. The communication interface is coupled to the processor. The processor is configured to run a program or instructions, to implement processes of the foregoing method embodiments, and a same technical effect can be achieved. To avoid repetition, details are not described herein again.

It should be understood that the chip mentioned in this embodiment of this application may also be referred to as a system-level chip, a system chip, a chip system, or a system-on-a-chip chip.

It should be noted that, in this specification, the term "include", "comprise", or any other variant thereof is intended to cover a non-exclusive inclusion, so that a process, a method, an article, or an apparatus that includes a list of elements not only includes those elements but also includes other elements that are not expressly listed, or further includes elements inherent to this process, method, article, or apparatus. An element preceded by "includes a . . . " does not, without more constraints, preclude the presence of additional identical elements in the process, method, article, or apparatus that includes the element. In addition, it should be noted that the scope of the method and the apparatus in embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiments may be implemented by software in addition to a necessary universal hardware platform or by hardware only. Based on such an understanding, the technical solutions of this application essentially or the part contributing to the prior art may be implemented in a form of a computer software product. The computer software product is stored in a non-transitory storage medium (such as a ROM/RAM, a hard disk, or an optical disc), and includes several instructions for instructing a terminal (which may be a mobile phone, a computer, a server, an air conditioner, a network device, or the like) to perform the methods described in embodiments of this application.

Embodiments of this application are described above with reference to the accompanying drawings. However, this application is not limited to the foregoing implementations. The foregoing implementations are merely examples, but are not limitative. Under the enlightenment of this application, a person of ordinary skill in the art may further make many forms without departing from the principles of this application and the protection scope of the claims, and all the forms fall within the protection of this application.

What is claimed is:

1. A call exception processing method, performed by an electronic device, wherein the method comprises:

sending first target signaling to a server, wherein the first target signaling is used by a transmit end device to establish a call connection to a receive end device;

receiving target exception information sent by the server, wherein the target exception information indicates that the first target signaling is exceptional; and regenerating, based on an exception type indicated by the target exception information, session description protocol (SDP) session information or a session initiation protocol (SIP) header field corresponding to the exception type, reassembling the regenerated SDP session information or the SIP header field and a signaling that is in the first target signaling and that is not exceptional, to generate second target signaling, and sending the second target signaling to the server.

2. The method according to claim 1, wherein the first target signaling is first SIP signaling, the first SIP signaling is used by the transmit end device to establish the call connection to the receive end device, and the first SIP signaling comprises a header field and the SDP session information;

or the first target signaling is first feedback signaling, and the first feedback signaling indicates a result of processing, by the receive end device, SIP signaling sent by the transmit end device.

3. A call exception processing method, performed by a server, wherein the method comprises:

receiving first target signaling sent by a transmit end device, wherein the first target signaling is used by the transmit end device to establish a call connection to a receive end device;

sending target exception information to the transmit end device in a case of detecting that the first target signaling is exceptional, wherein the target exception information indicates that the first target signaling is exceptional; and receiving second target signaling sent by the transmit end device, wherein the second target signaling is generated by the transmit end device through reassembling session description protocol (SDP) session information or a session initiation protocol (SIP) header field and a signaling that is in the first target signaling and that is not exceptional, and the SDP session information or the SIP header field is regenerated based on an exception type indicated by the target exception information.

4. The method according to claim 3, wherein after the receiving second target signaling sent by the transmit end device, the method further comprises:

sending the second target signaling to the receive end device in a case of detecting that the second target signaling is not exceptional; and receiving first feedback signaling sent by the receive end device, and sending the first feedback signaling to the transmit end device, wherein the first feedback signaling is SIP signaling that is sent by the receive end device after processing the second target signaling.

5. The method according to claim 4, wherein after the receiving first feedback signaling sent by the receive end device, the method further comprises:

sending first exception information to the receive end device in a case of detecting that the first feedback signaling is exceptional, wherein the first exception information indicates that the first feedback signaling is exceptional; and receiving target feedback signaling sent by the receive end device, and sending the target feedback signaling to the transmit end device, wherein the target feedback signaling is generated by the receive end device based on the first exception information, and the target feedback signaling is used by the transmit end device to establish the call connection to the receive end device.

6. An electronic device, comprising a processor, a memory, and a program or instructions stored in the memory and executable on the processor, wherein the program or the instructions, when executed by the processor, cause the electronic device to perform:

sending first target signaling to a server, wherein the first target signaling is used by a transmit end device to establish a call connection to a receive end device;

receiving target exception information sent by the server, wherein the target exception information indicates that the first target signaling is exceptional; and regenerating, based on an exception type indicated by the target exception information, session description protocol (SDP) session information or a session initiation protocol (SIP) header field corresponding to the exception type, reassembling the regenerated SDP session information or the SIP header field and a signaling that is in the first target signaling and that is not exceptional, to generate second target signaling, and sending the second target signaling to the server.

7. The electronic device according to claim 6, wherein the first target signaling is first SIP signaling, the first SIP signaling is used by the transmit end device to establish the call connection to the receive end device, and the first SIP signaling comprises a header field and the SDP session information;

or the first target signaling is first feedback signaling, and the first feedback signaling indicates a result of processing, by the receive end device, SIP signaling sent by the transmit end device.

8. A server, comprising a processor, a memory, and a program or instructions stored in the memory and executable on the processor, wherein when the program or the instructions are executed by the processor, steps of the call exception processing method according to claim 3 are implemented.

9. The server according to claim 8, wherein the program or the instructions, when executed by the processor, cause the server to further perform:

sending the second target signaling to the receive end device in a case of detecting that the second target signaling is not exceptional; and receiving first feedback signaling sent by the receive end device, and sending the first feedback signaling to the transmit end device, wherein the first feedback signaling is SIP signaling that is sent by the receive end device after processing the second target signaling.

10. The server according to claim 9, wherein the program or the instructions, when executed by the processor, cause the server to further perform:

sending first exception information to the receive end device in a case of detecting that the first feedback signaling is exceptional, wherein the first exception information indicates that the first feedback signaling is exceptional; and receiving target feedback signaling sent by the receive end device, and sending the target feedback signaling to the transmit end device, wherein the target feedback signaling is generated by the receive end device based on the first exception information, and the target feedback signaling is used by the transmit end device to establish the call connection to the receive end device.

11. A non-transitory readable storage medium, wherein the non-transitory readable storage medium stores a program or instructions, wherein when the program or the instructions are executed by a processor, steps of the call exception processing method according to claim 1 are implemented.

12. The non-transitory readable storage medium according to claim 11, wherein the first target signaling is first SIP signaling, the first SIP signaling is used by the transmit end device to establish the call connection to the receive end device, and the first SIP signaling comprises a header field and the SDP session information;

or the first target signaling is first feedback signaling, and the first feedback signaling indicates a result of processing, by the receive end device, SIP signaling sent by the transmit end device.

13. A non-transitory readable storage medium, wherein the non-transitory readable storage medium stores a program or instructions, wherein when the program or the instructions are executed by a processor, steps of the call exception processing method according to claim 3 are implemented.

14. The non-transitory readable storage medium according to claim 13, wherein the program or the instructions, when executed by the processor, cause the server to further perform:

sending the second target signaling to the receive end device in a case of detecting that the second target signaling is not exceptional; and receiving first feedback signaling sent by the receive end device, and sending the first feedback signaling to the transmit end device, wherein the first feedback signaling is SIP signaling that is sent by the receive end device after processing the second target signaling.

15. The non-transitory readable storage medium according to claim 14, wherein the program or the instructions, when executed by the processor, cause the server to further perform:

sending first exception information to the receive end device in a case of detecting that the first feedback signaling is exceptional, wherein the first exception information indicates that the first feedback signaling is exceptional; and receiving target feedback signaling sent by the receive end device, and sending the target feedback signaling to the transmit end device, wherein the target feedback signaling is generated by the receive end device based on the first exception information, and the target feedback signaling is used by the transmit end device to establish the call connection to the receive end device.

\* \* \* \* \*